United States Patent
Reid

[11] 3,864,051
[45] Feb. 4, 1975

[54] CONNECTING MEANS FOR TUBULAR MEMBERS

[76] Inventor: Robert Reid, 50 Transwell Ave., Willowdale, Ontario, Canada

[22] Filed: Mar. 22, 1973

[21] Appl. No.: 343,725

[30] Foreign Application Priority Data
May 8, 1972 Canada.............................. 141519

[52] U.S. Cl.................... 403/408, 403/20, 403/171, 403/292, 52/758 H, 52/656, 211/182
[51] Int. Cl............................................. F16b 7/22
[58] Field of Search............... 403/20, 169, 170–178, 403/217, 200, 205, 230, 231, 249, 250, 251, 257, 258, 295, 297, 264, 314, 292, 316, 44, 48; 52/758 H, 656, 753 D, 753 E, 585; 151/41.73, 7; 85/36; 211/182; 16/31 R, 31 A, 19, 43

[56] References Cited
UNITED STATES PATENTS

| | | | |
|---|---|---|---|
| 2,611,633 | 9/1952 | Webster | 403/264 X |
| 2,644,554 | 7/1953 | Katz | 403/230 X |
| 2,972,495 | 2/1961 | Yalen | 403/176 |
| 3,208,409 | 9/1965 | Gale | 151/41.7 X |
| 3,333,873 | 8/1967 | Triplett | 403/297 X |
| 3,488,666 | 1/1970 | Podell | 151/7 |
| 3,568,746 | 3/1971 | Faroni | 151/7 |
| 3,713,677 | 1/1973 | Du Preez | 403/297 |

FOREIGN PATENTS OR APPLICATIONS

| | | | |
|---|---|---|---|
| 1,518,329 | 2/1968 | France | 403/173 |
| 262,752 | 5/1970 | U.S.S.R. | 403/295 |
| 349,451 | 11/1960 | Switzerland | 403/48 |

*Primary Examiner*—Jordan Franklin
*Assistant Examiner*—Wayne L. Shedd

[57] ABSTRACT

A connecting device for hollowing tubing consisting of a centrally threaded hexahedron block, with a special stud having a left hand thread on one end and a right hand thread on other end. The stud engages the block at one end and a fastener at the other end, the fastener being at the inside end of the tube. Rotation of the stud causes the tube and block to come together or move apart, depending on the direction of rotation.

New fasteners are devised for tubing and an improvement made in the existing helix washer.

A decorative plug is used to cover holes that are exposed.

The completed assembly has a superior decorative appearance, versatility, and strength.

A machine is included to make rectangular or square blocks with grooves or recesses around the outside edges.

4 Claims, 20 Drawing Figures

PATENTED FEB 4 1975 3,864,051

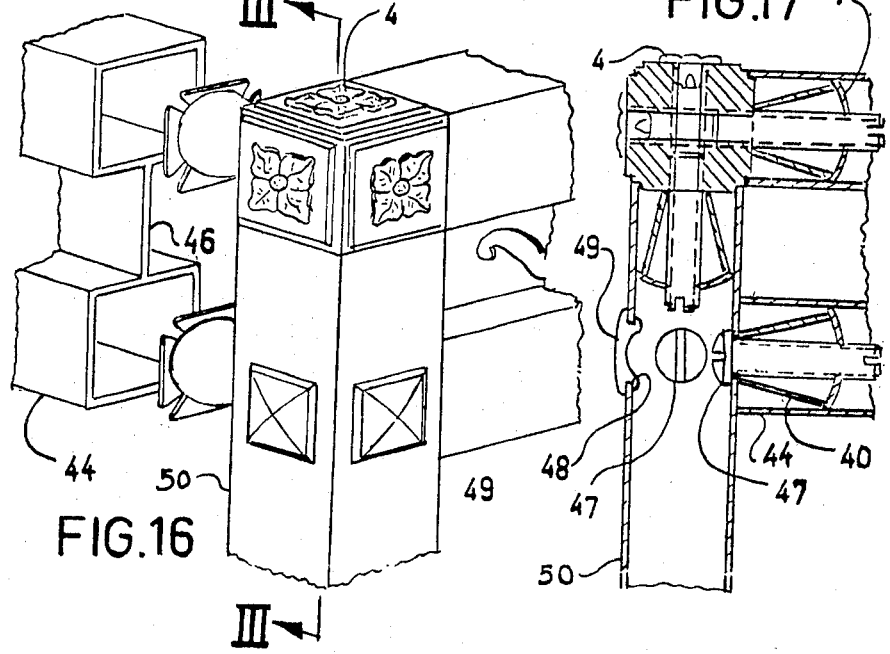

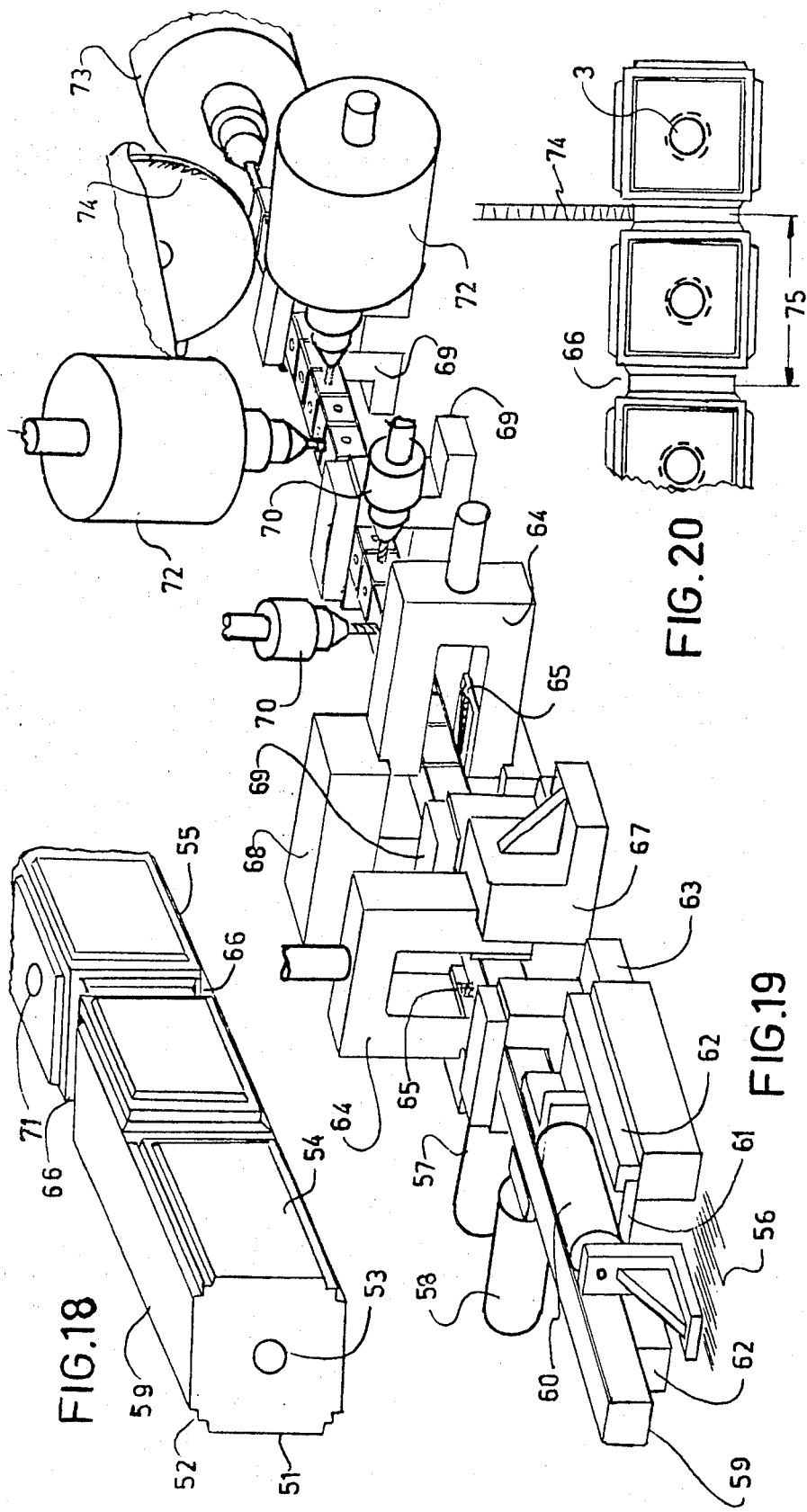

CONNECTING MEANS FOR TUBULAR MEMBERS

FIELD OF INVENTION

This invention relates to elements which connect tubular structures. It is expected that the primary use of this invention will be in the household and institutional furniture industries for connecting joints at the corners of tables, room dividers, chairs, picture frames and the like. Many other applications could be found in industry and architecture such as hand rails or wherever a mechanical joint is required for tubing.

BACKGROUND OF THE INVENTION

Previous methods have had the disadvantage that different components were required for different joint configurations. In one prior system this problem was realized and the basic components were reduced to four. Using the components herein referred to as the block, by the same reasoning reduces the number of components to one. In some other Prior Art the components do not have a pleasing appearance. In another plastic deforming components are used which could relax with age.

Most other Prior Art is only applicable to either round or square tubing whereas this invention may be used with a variety of shapes. Improvements are made in common helix washers which are used with the joint.

BRIEF DESCRIPTION OF THE DRAWINGS

In drawings which illustrate embodiments of the invention:

FIG. 10 is a perspective view of an expanding fastener.

FIG. 11 is a perspective view of the body of the fastener shown in FIG. 10, before it is rolled into a tubular shape.

FIG. 12 is a cross section of an internally threaded cap used on the fastener, shown in FIG. 10.

FIG. 13 is a fragmentary detail in partial cross section of an expanding fastener in its operating position.

FIG. 14 is a fragmentary detail of a corner connection with one tube removed exposing the fastener.

FIG. 15 is a perspective view of one of the fastener components shown in FIG. 14.

FIG. 16 is a fragmentary exploded isometric view of corner joint with deep rails.

FIG. 17 is a section of the line III—III, of FIG. 16.

FIG. 18 is an oblique view of a bar that is used to make square blocks. The bar is shown partially processed.

FIG. 19 is a perspective view of a machine to make square blocks.

FIG. 20 is a fragmentary detail showing of the last operation on the machine FIG. 19, where the finished block is cut off.

DETAILED DESCRIPTION OF THE PREFERRED EMBODIMENTS

Figure 1:
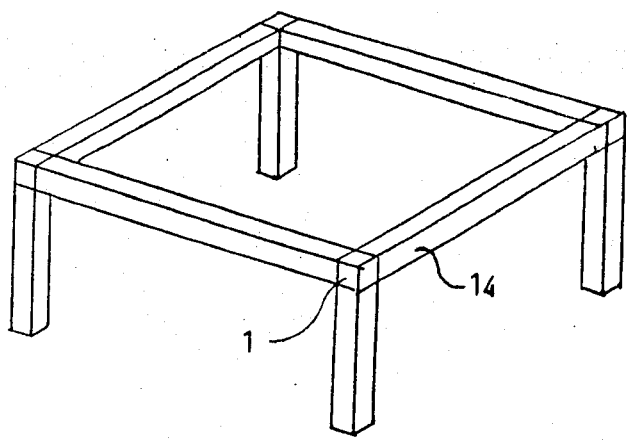
FIG. 1 is a perspective view of a table frame made from square tube having corner connections used in the invention.
Figure 2:
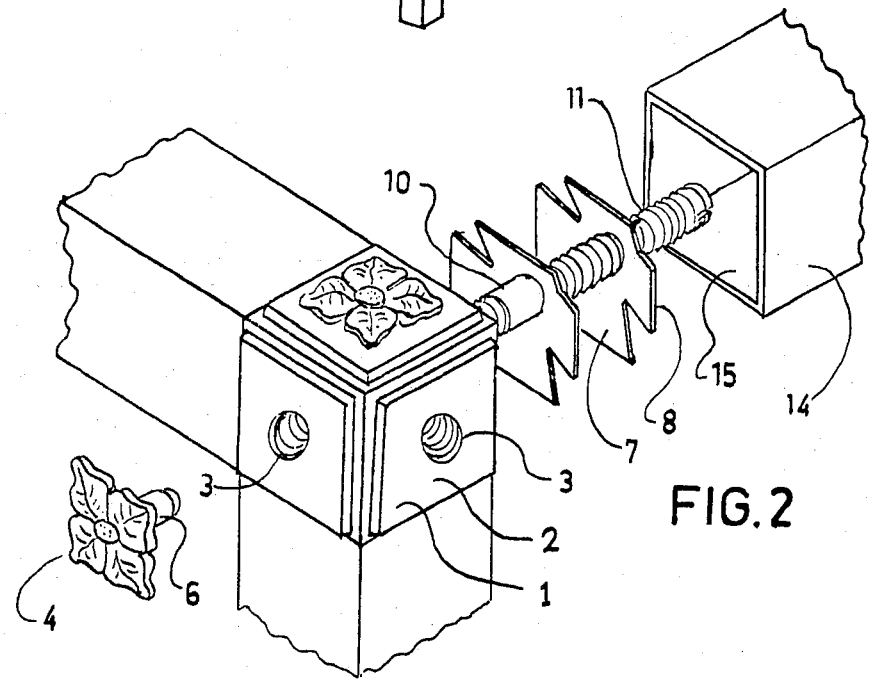
FIG. 2 shows a detailed exploded isometric view of the joint with the basic components.

Referring to the drawings, FIG. 1 shows a table frame connected by block 1 and other components which are shown in the enlarged exploded view of one corner indicated FIG. 2.

Figure 3:
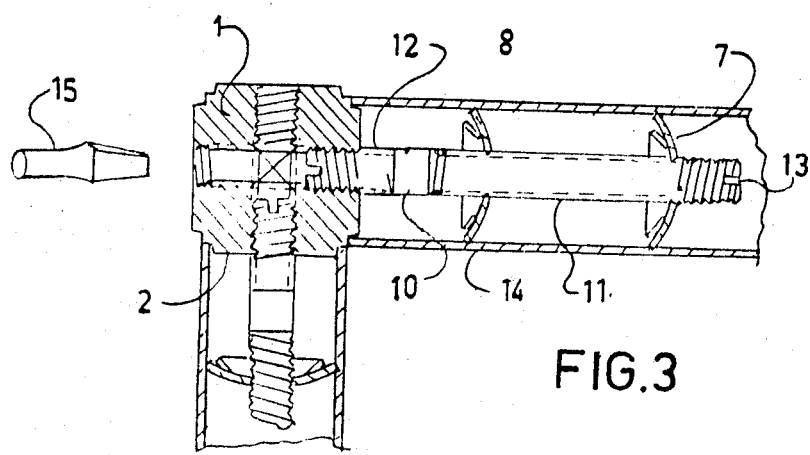
FIG. 3 is a fragmentary detail in cross section at the corner of two tubes connected at right angles.

Now referring to FIGS. 2 and 3, Block 1 has a raised area 2, in the centre which fits inside tube 14 at opening 15. The raised area 2, gives the exposed sides of the block a pleasing appearance and keeps tube 14 in line with block 1 when assembled. Holes 3 are drilled and tapped completely through block 1 in all three directions. Thus block 1 is a cube with a tapped hole in the centre of each of its six faces. The tapped holes pass through each other in the centre of the cube.

Stud 10 is threaded at 12 to match the holes 3 and can therefore be screwed into the block from any of the six sides.

The helix washers 7 has a spring action with sharp edge 8 against the interior walls of the tube and due to their curvature are easily pushed into the tube, but resist withdrawal. The helix washers 7 have left hand thread that matches the left hand thread 11 on the stud 10. Both ends of the stud 10 have screw driver slots 13 which may be reached through the block holes 3 from one end or through the tube 14 from the other end. Since the right hand and left hand threads 12 and 13 have counter rotating spiral, when the studs 10 are in position as shown in FIG. 3 and are rotated counter clockwise they will pull the block 1 and tube 14 together or when rotated clockwise it will push the block and tube apart. To assemble the block to the tube, stud 10 can first be threaded into the block 1, helix washers 7 added to the stud, and tube 14 pushed over the helix washers 7. The block can then be tightened with screw driver 15 which has a blade small enough to pass through block 1. Care is taken so that when studs are tightened they do not protrude into the block for enough to obstruct holes 3 which are crossing one another at the centre.

Alternately the helix washer 7 may first be threaded on to the stud at end 11 and then the stud with helix washers mounted thereon may be pushed into the tube. The block may be then threaded by hand onto the stud at end 12 until reaching the tube. When reaching the tube it is again tightened by a screw driver 15 through the hole in the block.

Assembly can proceed by either or both of the foregoing methods until the frame is complete.

The frame is finished by plugging holes 3 that are left exposed with decorative plug 4, if the article assembled is enhanced by the decorative plug. In industrial applications the plug may not be necessary. The outside diameter of plug stem 6 is slightly larger than the hole 3, so the plug is a push fit into hole 3. The head 5 decorates the plug and facilitates insertion and removal.

Figure 4:
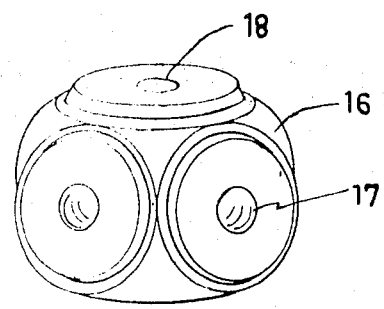
FIG. 4 is a perspective of a block for round tubing.

FIG. 4 shows a block 16, for round tube. The faces 17 have the same function and correspond to faces 2 on the square block. The holes 18 correspond to holes 3 on the square tube and have the same function.

Assembly is the same as for square blocks, but round tubes have an advantage that they can be tightened by holding the block and rotating the tube.

The tubes could also be hexagon or other shapes, with the approperiate blocks.

Figure 5:
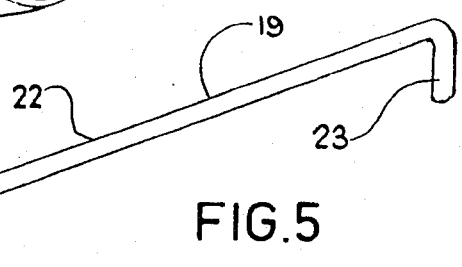
FIG. 5 is a perspective of a tool used to reach the screw through the far end of a square tube.

FIG. 5 shows a special tool that is required to tighten the stud 10 at end 11. This tool is required when long pieces of tube other than round tube are connected in a straight line and are joined by a hexahedron block and tight joints are required. The driving end 20 is made to fit the screw driver slot 13 in the stud 10.

Shaft 22 is of sufficient length to exceed the length of tube 14. The shaft 22 is inserted into the tube end opposite from the block end. The centering support 21 has diameter that is slightly smaller than the smallest inside width dimension of the tube, thereby, it is able to move freely back and forth along the inside of a tube when inserted. The centering support 21 holds the screw driver end 20 in line with slot 13, so that when handle 23 is turned, the end engages slot 13.

Figure 6:
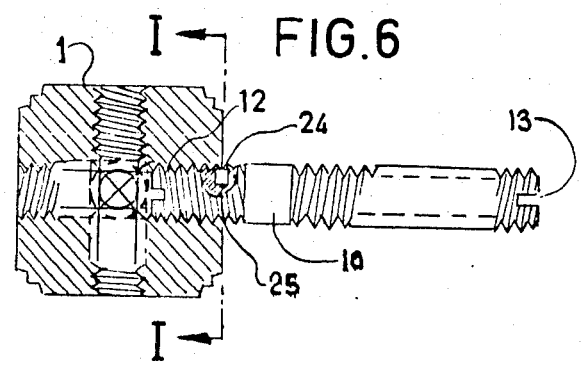
FIG. 6 is a cross section of a block with connection screw with a locking plug added.

FIG. 6 is a section through the centre of a block showing the addition of a locking device added to stud 10.

Figure 7:
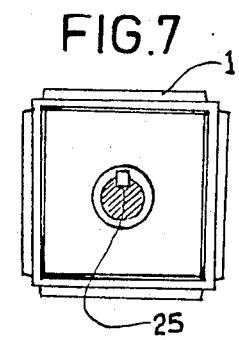
FIG. 7 is a section of the line I—I, of FIG. 6.

The locking device consists of a soft plastic cylinder 24 in hole 25 at end 12 of the stud. The height of the plastic plug is approximately equal to the distance from the bottom of the hole 25 to the mean diameter of thread as shown in FIG. 7, a section taken at right angles to 6 through the plastic cylinder 24. The distance of the drilled hole 25 from the end of stud 10 at 12 is less than depth of a hole 3 from face 2 to an intersecting hole 3. Therefore stud 10 will lock before blocking the intersection of holes 3. The locking action is caused by the threads inside hole 3 depressing the plastic cylinder 24. Therefore the addition of the plastic cylinder 24 besides providing locking, also reduces the skill required to assemble the blocks and tubes by gauging the distance that the stud 10 should be screwed into block 1, and thus giving the assembler an indication before the crossing holes are intersected.

Helix washers sometimes slip along the inside of the tube when the screw is tightened. The following fasteners are used in place of helix washers, as shown in FIG. 8 and FIG. 13 or used to improve the helix washer shown in FIG. 14 to prevent this slip action.

Figures 8, 9:
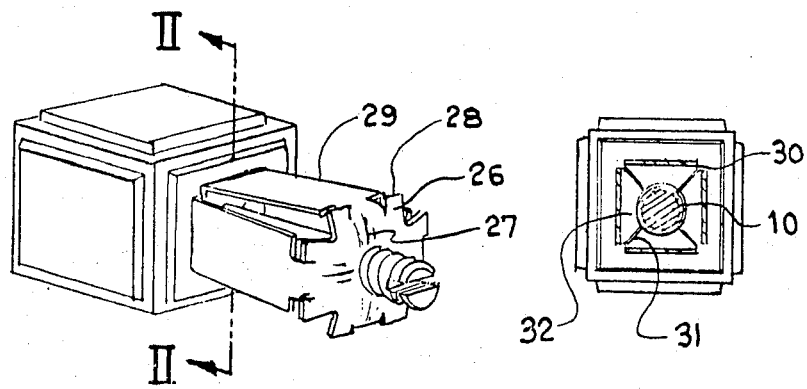
FIG. 8 is a perspective of an expanding fastener, mounted on a square block with a connecting screw.
FIG. 9 is a section of the line II—II, of FIG. 8.

FIG. 8 shows a fastener 26 which could be used in place of helix washer 7, FIG. 2.

The action of the sharp edges 28 biting into the tube walls 15 is increased by the supporting legs 29. When the fastener 26 is mounted on a block as shown in FIG. 8, and inserted into a square tube and stud 10 is rotated counter clockwise, fastener 26 is drawn towards block 1. Edges 28 are forced outwards by legs 29 as curvature 27 tends to flatten out. Legs 29 are turned over at 30 to bear on block 1. The ends 30 are chamfered at 31 and radiused at 32 to meet one another and provide clearance for stud 10 respectively.

FIG. 10 shows a tubular fastener 31 which could also be used in lieu of helix washer 7.

FIG. 11 shows the tubular section 31 before it is rolled up as shown in FIG. 10. Cap 36 has an internal thread 37 which mates with thread 11 on stud 10. The turned over tip 38 has a circular space 39 that is slightly less than the thickness of the tubular section 31 so when the Cap 36 is pressed onto the tubular member 31 it is a tight fit and will not rotate relative to 31.

FIG. 13 shows the fastener FIG. 10 in the operating position, used with a square block 1. The tube 14 is in partial section to show the fastener. The assembly is the same as previously explained. When the stud 10 is rotated counter clockwise, threaded Cap 36 is drawn towards the block 1 forcing legs 34 outwards and causing edges 35 to embed themselves into the inside wall 15 of the tube.

FIG. 14 shows a helix washer with a supporting cone 40 and stud mounted on a block for round tubing.

FIG. 15 shows an isometric detail of the support cone 40. The inside diameter of the cone at 41 is slightly larger than the outside diameter of stud 10. The outside diameter of the cone 40 at 42 is slightly smaller than the outside diameter of the round helix washer 43. If a square block was used with helix washer 7 and the cone 40, the outside diameter of the cone at 42 would not exceed the width of the washer 7.

Cone 40 used between the helix washer and the block, prevents the helix washer from slipping along the inside of the tube as the stud 10 is tightened. As tightening proceeds, the helix washer flattens, increasing its diameter. Support is provided by cone 40, by bearing on block 16 and reacting near the outer edge of the helix washer.

FIGS. 16 and 17 show a deep rail 44, which is used where extra strength is required, such as the joint between the skirt and legs of a large table. The deep rail consists of two tubes connected by a web 46. Block 1 may be used as previously described and any of the fasteners. Assembly is the same as previously described except the screw 47 is added with a fastener. Hole 48 is slightly larger than the head of the screw 47. The hole 48 is plugged with plug 49 to cover the hole and conceal the screw. An advantage of having the screw head inside the tube, besides hiding the screw head is that the screw may be tightened more securely. If the screw goes through the both walls of the tube 50 it could collapse the tube on tightening. Another advantage is the screws may be used at right angles to one another in the same horizontal plane without interference.

Single tubes may also be added in the foregoing manner, when used as cross members without a block, utilizing screw 47.

FIG. 18 shows the bar used in the machine FIG. 19. The bar has a profile 51 with corners shaped 52 and centre hole 53. Before processing in the machine, the bar has an appearance as shown at end 54. As processing proceeds, the appearance is as shown at end 55.

FIG. 19 shows the cutting, guiding and clamping components of a machine to make square blocks 1. The machine can be regulated by standard electric, hydraulic, or pneumatic components. The parts are mounted on a common convenient base 56. Cylinder 57 clamps bar 59 while the bar is stationary. Cylinder 58 holds the bar 59 while it is moving. Cylinder 60 moves plate 61 forwards and backwards in guides 62 so that the travel is in the direction of the centre line of the bar 59. Cylinder 58 is attached to plate 61 so that cylinder 58 travels with plate 61. Block 63 holds cylinder 57 and guides bar 59. Member 64 moves up and down guided by 67 and has broaching teeth 65 attached. The broaching teeth cut profile 66 vertically on both sides of bar 59. A second member 64, guided by block 68 moves in the horizontal direction cutting profile 66 in the top and bottom of the bar 59. Blocks 69 are located at intervals to guide and hold bar 59, but allow the bar to move in the direction of its longitudinal axis. Drills 70 are mounted so they drill horizontal and vertical holes 71 in the centre of the blocks.

Tapping heads 72 are mounted so they tap the holes 71, producing threaded holes 3. Tapping head 73 taps hole 53 on the axis of the bar producing a threaded hole 3. Saw 74 cuts off blocks as shown enlarged in FIG. 20. The machine is operated by placing a bar in the machine just past the first broach 65. When the machine is activated, cylinder 60 advances the bar 59 by a distance 75 with cylinder 58 clamping bar 59 and cylinder 57 released. Then cylinder 57 clamps the bar and cylinder 58 releases, cylinder 60, then retracts the amount previously advanced. While cylinder 60 is retracting the broachs, drills, and tapping heads are activated. After they have completed their cycle and retracted, saw 74 cuts off a block 1 when the bar has progressed that far.

Cylinder 58 clamps, cylinder 57 releases, cylinder 60 advances and thus the cycle is repeated. Friction is applied at the last support block 69 so that the bar in the machine does not move more than the distance advanced by cylinder 60 when it is being pushed along by the next bar inserted into the machine.

The tapping head 73 could be adopted to drill, as well as tap. Other operations to provide decorative surface finishes would be done after machining as described in the foregoing.

While certain embodiments have been illustrated and described for the purpose of disclosure, it will be understood that the invention is not limited thereto, but contemplates such modifications and other embodiments as may be utilized without departing from the invention.

I claim:

1. A connector for orthogonally connecting together at least two elongate tubular members comprising in combination a hexahedron block having a raised surface on at least two orthogonally oriented faces of said hexahedron block, each raised surface having a circumferential outline corresponding to the inside perimeter of a tubular member to be connected to permit insertion of the raised surface in an end of the tubular member; a threaded stud having a left hand thread at one end and a right hand thread at the other end, both ends of said stud having means for receiving a driving tool to rotate said stud; a threaded bore extended axially through said hexahedron block and between two diametrically opposed faces of said hexahedron block, there being a threaded bore extending through each of said raised surfaces of said hexahedron block; the number of threaded bores being equal to the number of raised surfaces; a helically threaded washer having a circumferential dimension which permits insertion thereof into a tubular member; said washer having resilient means for permitting insertion of the washer within the tubular member and for precluding removal of the washer from the tubular member; said threaded bore having an internal thread for receiving a threaded end of said threaded stud and said washer having an internal thread for receiving the other threaded end of said threaded stud; each end of said threaded stud being threaded into the corresponding internal thread of said threaded bore and said washer to connect said block to the tubular member upon positive rotational advancement of the threaded stud in said washer where the longitudinal axis of said threaded stud is substantially parallel to the longitudinal axis of the tubular member being connected; said threaded stud extending less than halfway into the respective threaded bore.

2. The combination defined in claim 1 wherein a plug is used to cover threaded holes which are unused.

3. The combination of claim 1 wherein said resilient means includes an expanding fastener which is activated by the positive rotation of said threaded stud in said washer.

4. The combination of claim 3 wherein a truncated hollow cone is positioned between said washer and the respective raised surface of said hexahedron block, said threaded stud extending through said cone, the end of the cone adjacent said washer being slightly smaller than the washer in width and the opening in the end of the cone adjacent the raised surface of said hexahedron block being slightly larger than the diameter of said stud.

* * * * *